United States Patent [19]
Sakai et al.

[11] Patent Number: 6,115,511
[45] Date of Patent: Sep. 5, 2000

[54] UNDERWATER LASER IMAGING APPARATUS

[75] Inventors: Hiroshi Sakai; Kenzi Hirose; Hirotoshi Igarashi, all of Niigata; Junichi Akizono, Yokosuka; Eiji Satoh, Yokosuka; Toshinari Tanaka, Yokosuka; Yoshiaki Takahashi, Tokyo; Shiro Ishida, Matsudo; Harukazu Asatsuma; Toshitaka Saito, both of Tokyo, all of Japan

[73] Assignees: Director General of the 1$^{th}$ District Port Construction Bureau, Ministry of Transport, Niigata; Director General of Port and Harbour Research Institute, Ministry of Transport, Yokosuka; Ishikawajima-Harima Heavy Industries Co., Ltd., Tokyo, all of Japan

[21] Appl. No.: 08/958,564

[22] Filed: Oct. 27, 1997

[30] Foreign Application Priority Data

| Oct. 28, 1996 | [JP] | Japan | 8-285623 |
| Oct. 28, 1996 | [JP] | Japan | 8-285624 |
| Oct. 28, 1996 | [JP] | Japan | 8-285625 |

[51] Int. Cl.$^7$ ............................................. G06K 9/20
[52] U.S. Cl. ................................ 382/312; 348/81
[58] Field of Search ............................ 382/100, 312, 382/318, 321; 348/81; 250/573, 574; 356/436; 359/141; 372/35

[56] References Cited

U.S. PATENT DOCUMENTS

| 4,174,524 | 11/1979 | Moran | 358/95 |
| 4,764,932 | 8/1988 | Peterson et al. | 372/35 |
| 5,091,778 | 2/1992 | Keeler | 358/95 |
| 5,233,415 | 8/1993 | French et al. | 358/95 |
| 5,353,054 | 10/1994 | Geiger | 348/81 |
| 5,446,529 | 8/1995 | Stettner et al. | 356/4.01 |
| 5,506,616 | 4/1996 | Scheps | 348/31 |

FOREIGN PATENT DOCUMENTS

| 0 494 698 | 7/1992 | European Pat. Off. | G01S 17/88 |
| 55-74437 | 6/1980 | Japan | G01M 3/16 |
| 55-74527 | 6/1980 | Japan | G03B 17/08 |
| 62-237861 | 10/1987 | Japan | H04N 1/04 |
| 2-238420 | 9/1990 | Japan | G02B 23/26 |
| 3-138582 | 6/1991 | Japan | G01S 15/16 |
| 4-232580 | 8/1992 | Japan | G06F 15/72 |
| 5-40077 | 2/1993 | Japan | G01M 19/00 |

(List continued on next page.)

OTHER PUBLICATIONS

Yin et al., "A Pixel Range Gated Imaging System for Underwater Viewing and Range Finding," IEEE Proc. 1990 Symposium on Autonomous Underwater Vehicle Technology, Jun. 5–6, 1990, pp. 280–285.

(List continued on next page.)

*Primary Examiner*—Andrew W. Johns
*Attorney, Agent, or Firm*—Oblon, Spivak, McClelland, Maier & Neustadt, P.C.

[57] ABSTRACT

A simulation method for imaging of an underwater object is performed by simulating the object with a test panel having several strips of different brightness, and irradiating the test panel with a pulsed laser beam having three primary colors. From the reflected beam pulses, contrast values of the test stripes are computed for reflected pulses of each color in relation to the turbidity and visibility distance. The method may be used in conjunction with an imaging apparatus having a laser generation device which produces three primary colors of three different wavelengths; a laser beam detection device to receive the reflected beam pulses of respective primary colors, to determine intensities of the reflected beam pulses of respective primary colors, and to output three primary color signals to an image monitoring device. The imaging system may also be arranged so that a laser irradiation device, a laser beam detection device and an image monitoring device are all placed underwater in a submersible vessel with appropriate provisions for hydrostatic pressure and unmanned operation.

5 Claims, 8 Drawing Sheets

FOREIGN PATENT DOCUMENTS

| | | | | |
|---|---|---|---|---|
| 5-187833 | 7/1993 | Japan | G01B | 11/24 |
| 6-102021 | 4/1994 | Japan | G01B | 11/24 |
| 6-121200 | 4/1994 | Japan | H04N | 5/225 |
| 7-72250 | 3/1995 | Japan | G01S | 17/88 |
| 8-191167 | 7/1996 | Japan | H01S | 3/092 |
| 8-236844 | 9/1996 | Japan | H01S | 3/102 |
| 8-266649 | 10/1996 | Japan | A61N | 5/06 |

OTHER PUBLICATIONS

Gordon, "Use of Laser Scanning System on Mobile Underwater Platforms," IEEE Proc. 1992 Symposium on Autonomous Underwater Vehicle Technology, Jun. 2–3, 1992, pp. 202–205.

Klepsvik et al., "A Novel Laser Radar System for Subsea Inspection and Mapping," *IEEE Proc. OCEANS '94: Oceans Engineering for Today's Technology and Tomorrow's Preservation,* Sep. 13–16, 1994, pp. II–700 to II–705.

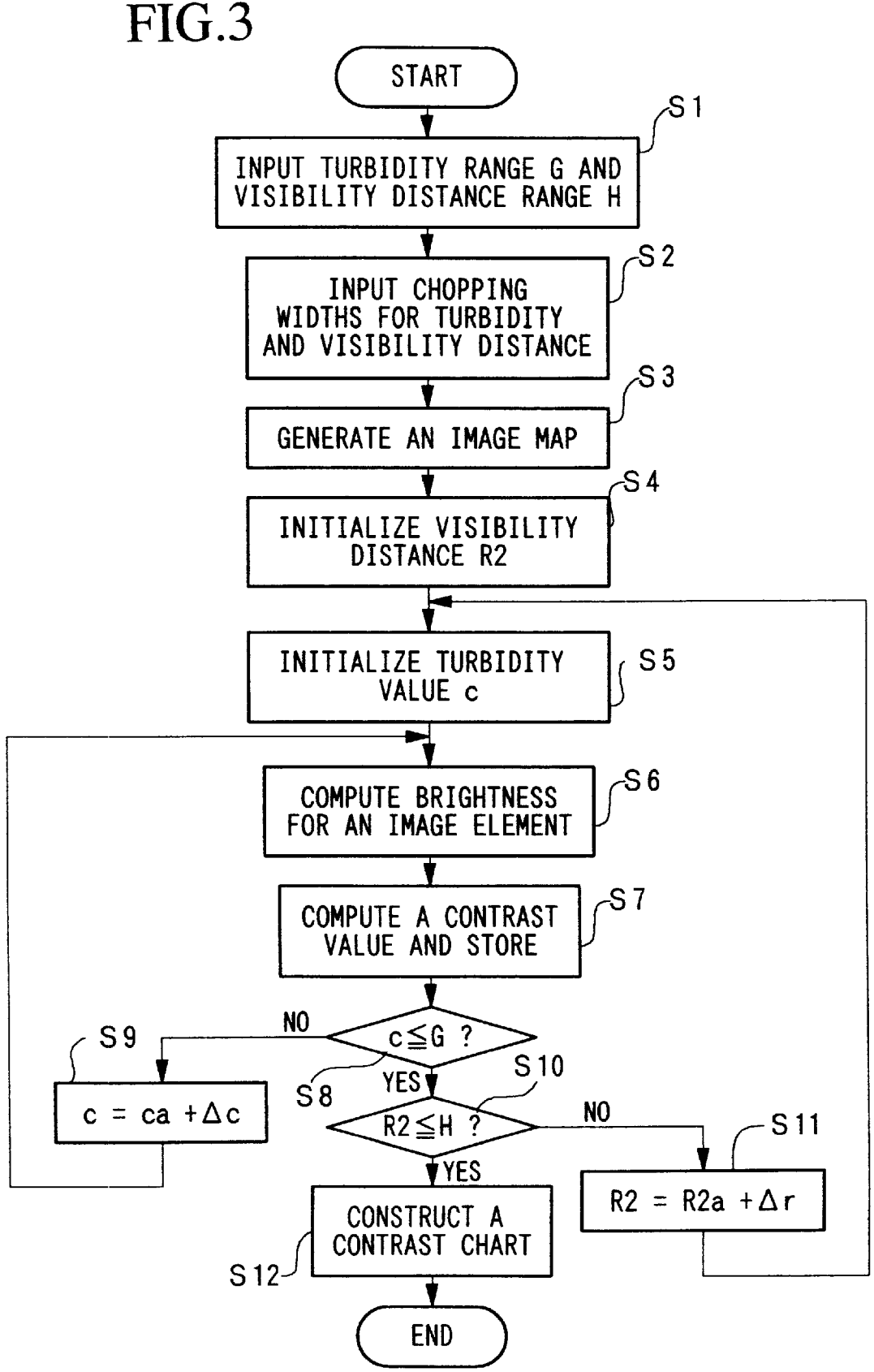

FIG.5
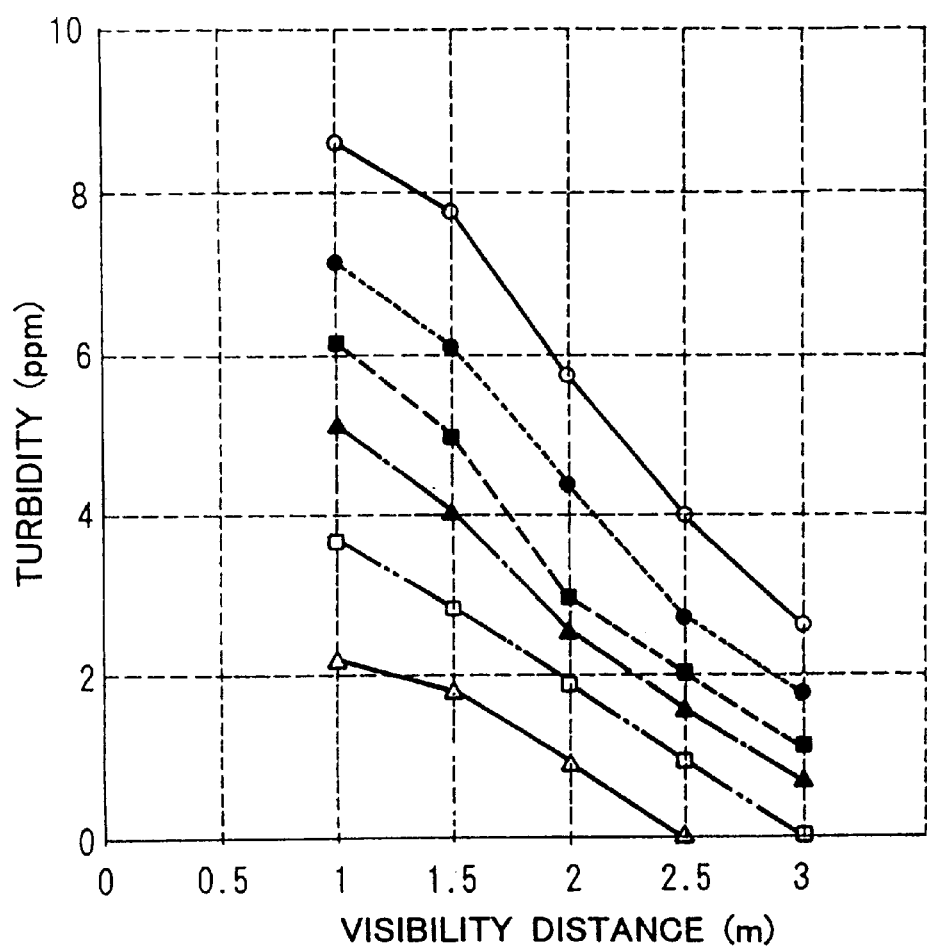

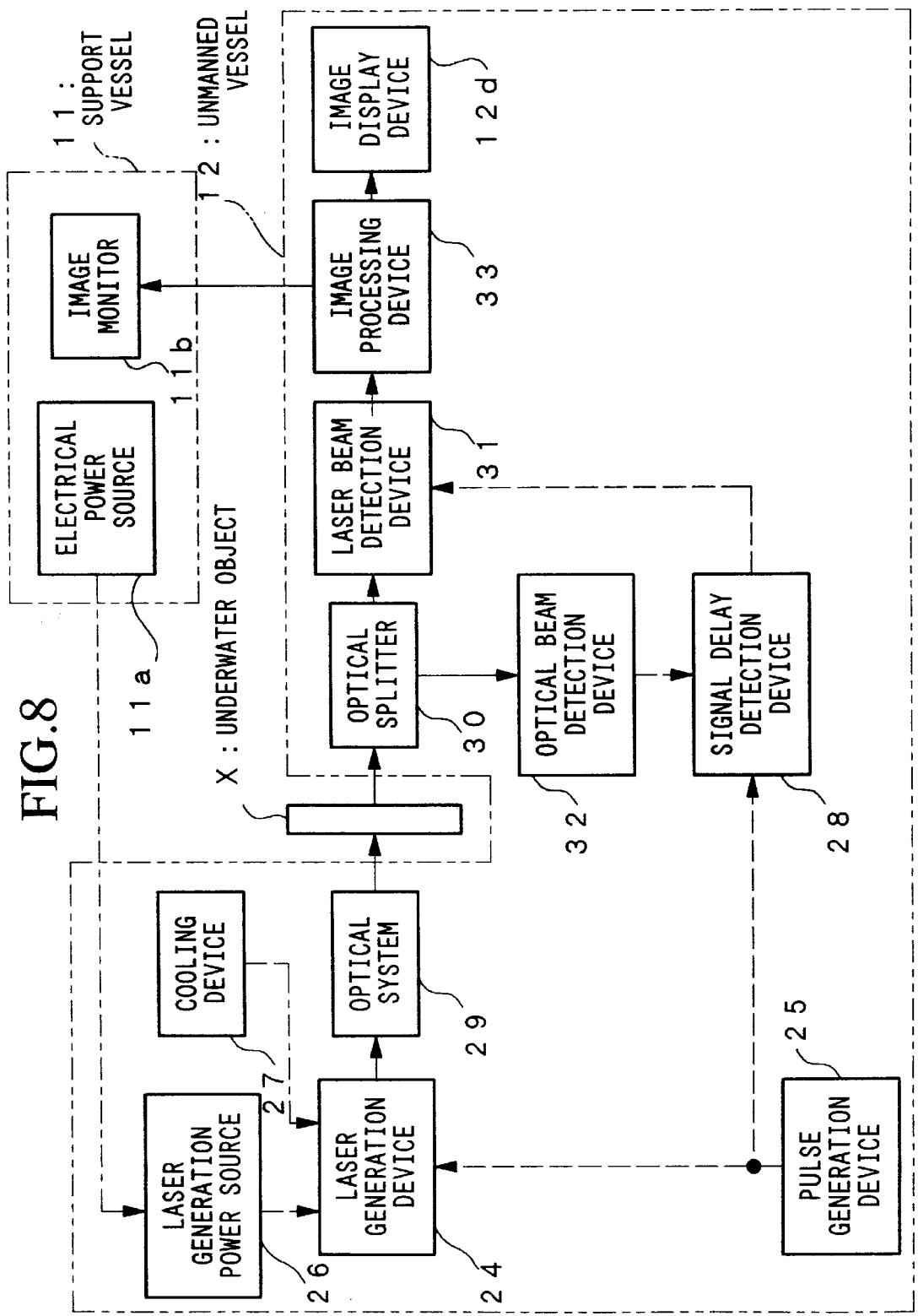

UNDERWATER LASER IMAGING APPARATUS

BACKGROUND OF THE INVENTION

1. Field of the Invention

The present invention relates in particular to a technology for observing an underwater object with a laser imaging apparatus.

2. Description of the Related Art

A Japanese Patent Application, First Publication, H7-072250 discloses an imaging technology, applicable to underwater marine construction projects and others, for reliably identifying an object disposed in a murky underwater environment with a laser-based imaging equipment. The laser imaging technology disclosed in this publication is based on projecting a pulsed laser beam towards a distant underwater object from an observation/imaging unit, and producing images of the object by detecting the laser beam pulses reflected from the object.

When using such an laser-based underwater observation apparatus, the distance over which the object is observable (visibility) varies depending on the turbidity of the sea water (beam propagation medium). For this reason, it is necessary to decide where to locate the observation equipment, depending on the turbidity of the environment. Also, depending on the operating characteristics of the observation equipment, such as pulsing rate, pulse width and pulse energy of the laser irradiation device, the settings for ancillary devices such as zoom lens and shutter speed of the camera also need to be adjusted.

When it is desired to observe the object in its realistic state in spite of the turbid state of the underwater environment, it is preferable to capture the image in color. For such reasons, there has been strong demand for a technology to enable observation of underwater objects in color.

Furthermore, in the conventional arrangement described above, the beam pulses are delivered from a support vessel to a submersible vessel through optical fiber cable, resulting that the optical power of the output pulses is limited by the transmission capacity of the optical fiber cable. On the other hand, it is known that the clarity of the object image formed depends on the properties of the laser pulses such as the coherency of the beam manifesting in narrow width of the pulse and high optical power. Thus, the problem in the conventional laser-based observation equipment is that it has not been possible to irradiate laser pulses of sufficiently high optical power towards the object to generate clear images.

SUMMARY OF THE INVENTION

The present invention relates to a solution to the problems outlined above, and the objectives can be summarized as follows.

(a) To present a method of simulating the underwater environment to facilitate the use of the underwater laser imaging equipment;

(b) To present a color imaging apparatus to enable viewing the underwater object in three primary colors;

(c) To present a laser imaging apparatus for enabling to deliver a high intensity pulsed laser beam to the underwater object;

(d) To present a laser imaging apparatus for enabling to decrease the pulse width of the pulsed laser beam radiating on the underwater object;

(e) To present a laser imaging apparatus for enabling to produce clearer images than those produced by conventional imaging apparatus.

To achieve these objectives, a method is presented for simulating an imaging process of an underwater object comprising the steps of: preparing a test panel comprising a plurality of reference brightness sections of different reflective qualities for simulating the underwater object; irradiating a pulsed laser beam towards the test panel; and processing reflected beam pulses and computing contrast values of the reflected beam pulses, reflecting from the reference brightness sections, in relation to a turbidity value of a beam transmission medium and a visibility distance.

Adopting this simulation method means that imaging simulation testing for an underwater object is carried out by using a test panel having different brightness sections and computing contrast values of the reflected beam pulses, in terms of the turbidity of the transmission medium and the visibility distance, therefore, actual imaging task is facilitated greatly because it is necessary to measure only the on-site turbidity of the transmission medium to obtain a relationship between the contrast values and the visibility distance to be expected in the existing environment.

This method is superior, because it enables to presuppose the visibility distance, for example, necessary to generate a given degree of contrast in the on-site image so that the location and operational parameters of the imaging apparatus can be established in advance. This means that the location and the operating parameters can be decided at the actual observation site, thus eliminating need for changes in the settings during the actual work so that the effort can be focused on the task of studying the underwater object rather than on adjusting the imaging parameters.

The method of simulation is applied most effectively with a laser imaging apparatus comprising: a laser generation device for generating three primary colors of visible light, each color comprised by a pulsed laser beam having a respective wavelength, and irradiating pulsed laser beams towards the underwater object; a laser beam detection device for separating reflected beam pulses reflecting from the underwater object into a wavelength component representing each of the three primary colors, determining an intensity value for each of three wavelength components and outputting three primary color signals according to intensity values; and an imaging device for forming an image of the underwater object based on the three primary color signals.

By adopting this approach, images are made much more clearly visible because of the clear and high contrast color images of the object produced by the apparatus provided with a laser generation device having three primary colors and analyzing the reflected beam pulses in terms of high intensity values for the individual colors and forming the images based on enhanced contrast values of the three primary colors.

A modification of the basic system of laser imaging apparatus comprises: a laser irradiation device disposed underwater for irradiating an underwater object with a pulsed laser beam; a laser generation device disposed underwater for generating the pulsed laser beam; a laser beam detection device for receiving reflected beam pulses reflected from the underwater object; and an image processing device for forming images of the underwater object according to output signals from the laser beam detection device.

By using the apparatus presented above, a pulsed laser beam can be directed at the underwater object without transmitting the laser beam through an optical medium such as optical fibers which limit the laser energy that can be transmitted, therefore, the underwater object may be scanned with a laser beam of higher energy than that generated by conventional laser generation apparatus. Furthermore, because the pulse energy of the beam can be increased to increase the energy of the reflected beam pulses, the pulse width may be decreased thereby improving the resolution of the image.

BRIEF DESCRIPTION OF THE DRAWINGS

FIG. 3 is a main flowchart showing the steps for a simulation test.

FIG. 5 is an example of a graphical representation of a contrast chart generated in a simulation test.

FIG. 8 is a block diagram of another embodiment of the electrical circuitry in the submersible vessel part of the underwater laser imaging apparatus.

DESCRIPTION OF THE PREFERRED EMBODIMENTS

Preferred embodiments will be presented in the following with reference to the drawings.

Figure 1:
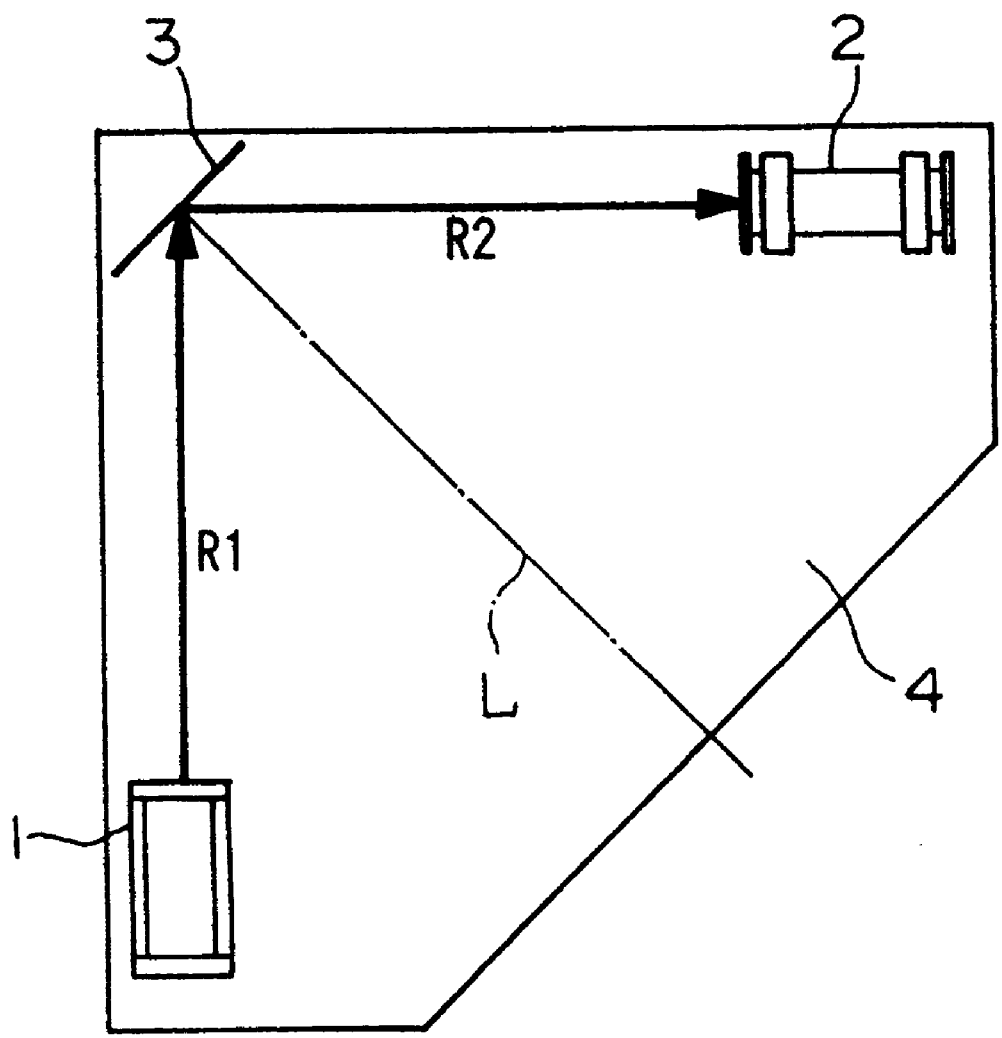
FIG. 1 is a schematic plan view of an embodiment of the underwater laser imaging apparatus of the present invention.

An example of simulation testing will be presented with reference to FIG. 1.

In the drawing, a laser irradiation device 1 generates a pulsed laser beam, of a specific pulsing rate, to be directed to an object 3 disposed at a distance R1, and images are observed in an imaging device 2 disposed at a distance R2. The object may be a test panel having, for example, a test pattern shown in FIG. 2A, comprised of an alternating white sections (reference brightness section) and black sections (reference brightness section) arranged on a flat board.

The imaging device 2 is disposed at a distance R2 (visibility distance) from the object 3, and detects the intensity of the reflected laser beam pulses. The imaging device 2 has a shutter device which is synchronized to the pulsing frequency of the pulsed laser beam so as to detect the reflected beam pulses only during its open period (open duration: ta). A beam transmission medium 4 having a specific turbidity c is placed in the separation spaces, between the object 3 and the laser irradiation device 1, and between the object 3 and the imaging device 2.

Simulation testing is performed by a computer such as work station computer, which stores initial data, in its memory, for the various operating parameters related to the underwater operation of the laser imaging apparatus.

Some of the initial data are as follows:

(1) Distance R1 from the object 3 to the laser irradiation device;

(2) Distance R2 (visibility distance) from the object 3 to the image recording device 2;

(3) Angle γ between the normal line L to the object 3 and the incidence direction of the pulsed laser beam;

(4) Turbidity c of the beam transmission medium (acting as an attenuation coefficient for the pulsed laser beam);

(5) Wavelength λ of the pulsed laser beam;

(6) A time function for laser pulsing;

(7) Optical parameters for the imaging device 2, such as aperture f, focal point distance and shutter opening duration ta; and (8) Image data for the test pattern.

Also stored in the memory are various numerical functions for computing the direct reflection components Ed, back scattered components Ebs, and forward scattered components Efs, according to the initial data. These functions express relations among the environmental parameters, such as the visibility distance R2 and the turbidity c of the beam transmission medium 4. in terms of the initial data. One such relation is reported in a publication, by H. Ishimura, "Random Wave Propagation and Scattering in an Optical Medium" by Washington University, Washington, USA.

The simulation process may be broadly summarized as follows: the computer generates the values of the reflected beam intensity (brightness of the test image) captured by the imaging device 2, according to the simulation process programmed into the underwater laser imaging apparatus, using the initial data and other data input from input devices such as keyboard, and computes the contrast values for the white section brightness and the black section brightness as described later in more detail. The results of computation are displayed on a display or printer device.

Details of the simulation process in the present embodiment will be discussed with reference to FIG. 3.

First, the parameters for the turbidity simulation range, i.e., a range of values G for the beam transmission medium turbidity c, and the distance simulation range, i.e. a range of values H for the visibility distance R2, will be input through the keyboard and other means (step S1) as well as the number of nodes which relate to the simulation computation points for the turbidity chopping width Δc and the visibility distance chopping width Δr which are entered through the keyboard and other means (step S2).

Figure 2A:
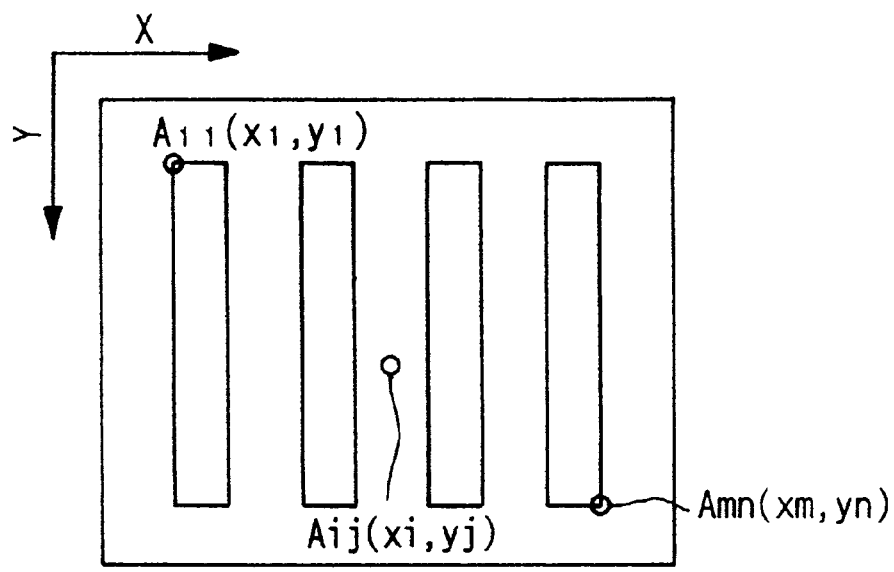
FIG. 2A is a plan view of a test pattern, for the apparatus of the present invention, used for simulation purposes.
Figure 2B:
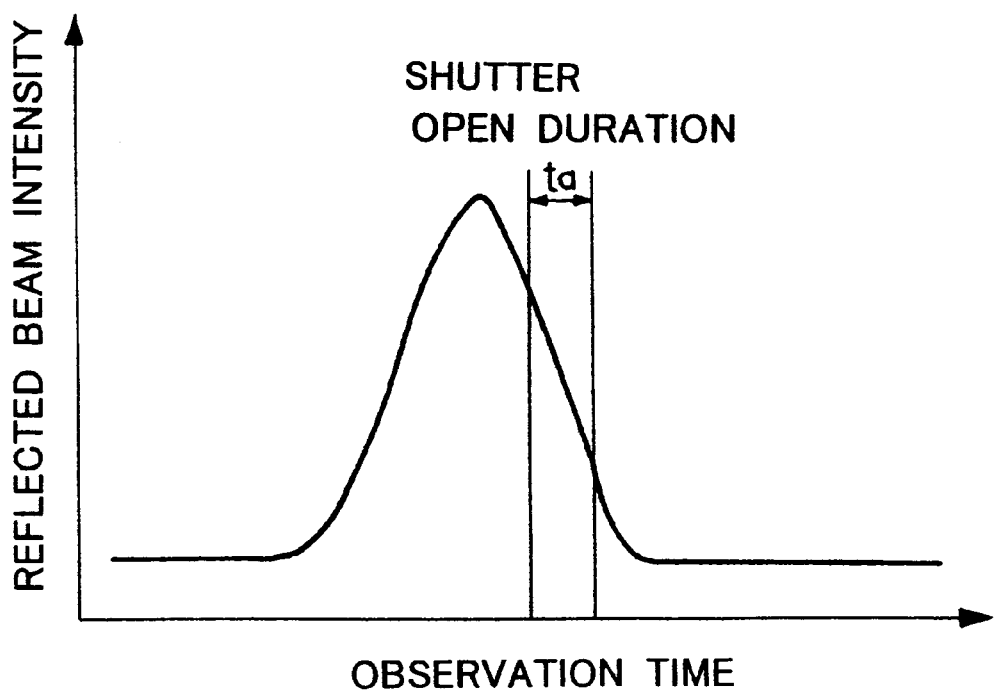
FIG. 2B is a graph showing a relation between the intensity of reflected beam and shutter opening duration obtained during a simulation test.

When the simulation ranges have been defined, the test pattern shown in FIG. 2A is divided into a number of image elements M (an integer) in the X-axis direction (horizontal, for example), and into a number of image elements N (an integer) in the Y-axis direction (vertical, for example), and each image element is given coordinate values of its location for generating an image map (step 3). For instance, the test pattern is divided into a number of image elements, ranging from an element near the left top region defined by A11 to an element near the right bottom region defined by Amn, so that the entire image area is defined by a two dimensional array of A11~Aij (i, j are integers)~Amn. The image elements relate to each other by their coordinate points x1~xi~xm in the horizontal direction and by the coordinates points y1~yj~yn in the vertical direction. The image map may be stored in memory in a form of a table.

In step S1, when the values, of the minimum turbidity ca and the maximum turbidity cb for the turbidity range G and of the minimum visibility range R2a and the maximum visibility distance R2b for the visibility distance range H, are input into the computer, the visibility distance R2 is initialized to the minimum visibility distance R2a (step S4) and the turbidity c is initialized to the minimum turbidity ca (step S5). The following computations are then carried out.

Figure 4:
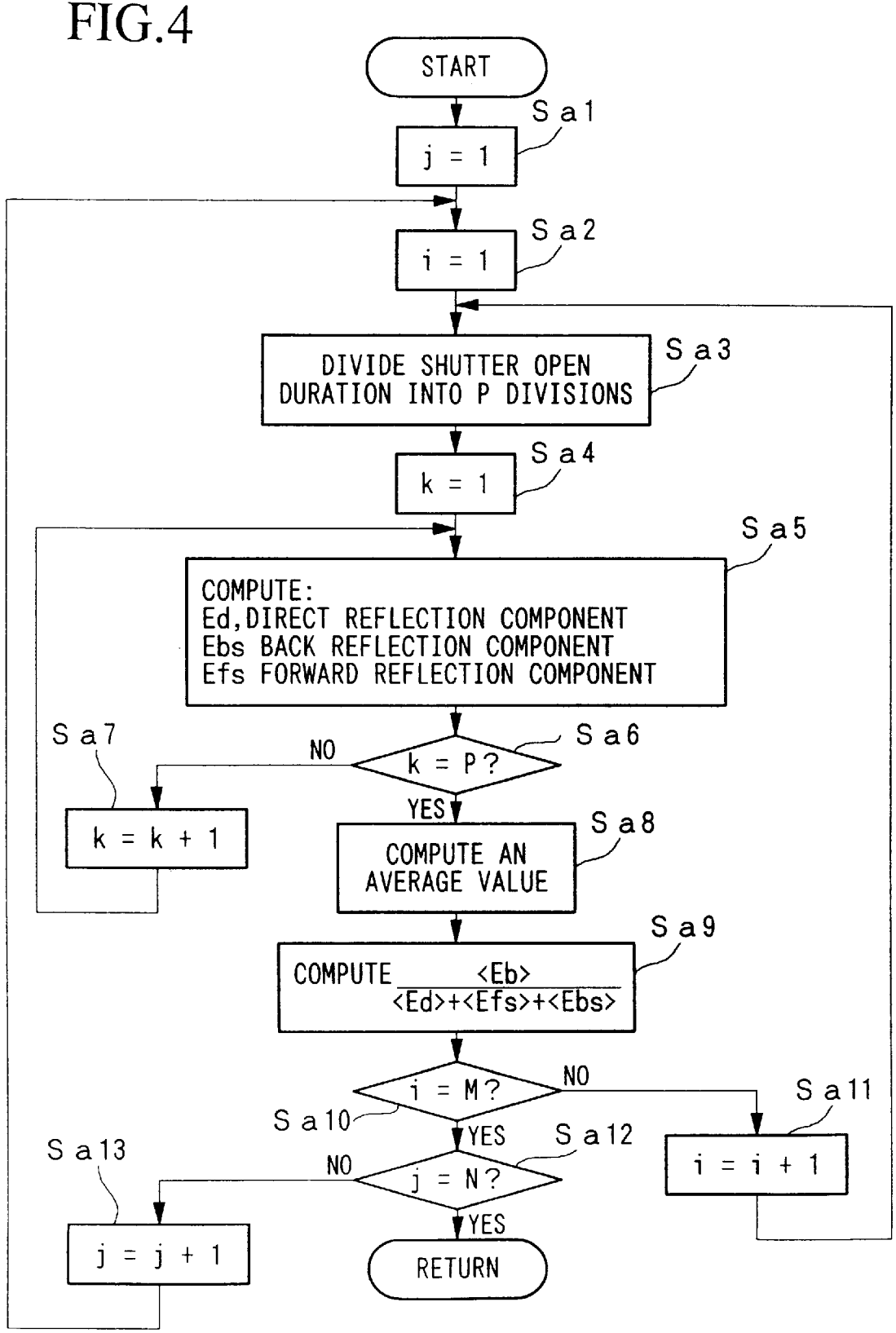
FIG. 4 is a detailed flowchart of a part of the main flowchart shown in FIG. 3.

In step S6, brightness values for each of the image elements A11~Amn are computed. The computation steps will be explained with reference to FIG. 4.

First, the integer j is initialized to [1] (step Sa1), and the integer i is initialized to [1] (step Sa2) so that the processing for the image element A11 may be started. The shutter-open duration ta is divided into a P number of divisions (an integer) representing a number of time elements t1~tk (an integer k)~tp (step Sa3), and the integer k is initialized to [1] (step Sa4). By repeating the subsequent steps Sa5~Sa7 successively, the direct reflection components Ed, the back scattered components Ebs and the forward scattered components Efs are computed for each of the time divisions t1~tk for the image element A11.

In more detail, in step Sa5, the direct reflection components Ed, the back scattered components Ebs and the forward scattered components Efs are computed for the time element t1, and in step Sa6, it is examined whether the current value of integer k is equal to the value of integer P. Since the integer k is set to [1] at this time, judging result is [No], and the integer k is incremented in step Sa7, so that the steps Sa5~Sa7 will be repeated until k=P is reached.

When all the steps in Sa5~Sa7 are repeated P times so that the direct reflection components Ed, the back scattered components Ebs and the forward scattered components Efs are computed for all the time elements t1~tk, the result of examination in step Sa6 is [Yes], and, in step Sa8, averaged values of the direct reflection components Ed, the back scattered components Ebs and the forward scattered components Efs are computed to generate an average direct reflection component <Ed>, an average back scattered component <Ebs> and an average forward scattered component <Efs>. Brightness (intensity of reflected light) D11 for the image element A11 is computed according to the following equation:

$$D11 = <Ed>/(<Ed> + <Ebs> + <Efs>) \tag{1}$$

Computations carried out in the steps Sa3~Sa9, presented above, are repeated in the following steps Sa10 and Sa11 for all the image elements A11~Am1 along a row 1 in the horizontal direction. That is, in step Sa10, it is examined whether integer i is equal to integer M for the number of horizontal divisions of the image element. If the judgment is [No], integer i is incremented in step Sa11, and the steps Sa3~Sa9 are repeated for the image element A21 which is on the right column of image element A11.

The series of computations, described above, are repeated M times so that the brightness values D11~Dm1 for all the image elements A11~Am1 in the horizontal row 1 will be produced, and similarly in steps Sa12, Sa13, brightness values D12~Dmn are produced for all the image elements A12~Am2 and image elements A1n~Amn in the vertical columns. All the steps in S6 will be completed when all the values of the brightness D11~Dmn for all the image elements A11~Amn in the test pattern have been computed.

Returning to the main flowchart in FIG. 3, in step S7. an image element is selected, for example Aij an image element in the central region of the test pattern, and a ratio of the maximum and minimum brightness values is obtained to generate a contrast value between the white and black sections, and this contrast value is stored to correspond with its location in the image map. It is permissible to compute all the contrast values from the values of the maximum and minimum brightness, by selecting all the image elements A11~Amn in this step S7.

The processing steps to this stage have determined the contrast values for a set of conditions of minimum turbidity ca and minimum visibility distance R2a. In the following steps S8 and S9, contrast values for the entire range of turbidity range G will be computed. Specifically, in step S8, it is examined whether all the values of turbidity, from the minimum turbidity ca to the maximum turbidity cb, over the turbidity range G have been computed, and if the judgment is [No], then the current turbidity value c is incremented by a turbidity chopping width $\Delta c$ in step S9, and all the steps subsequent to step S6 are repeated.

When the turbidity value c exceeds the turbidity range G, the judgment in step S7 becomes [Yes], and it proceeds to steps S10 and S11 so that all the contrast values for the entire turbidity range G and the visibility range H will be generated. In step S12, the values of turbidity c and visibility distance R2 for a given value of contrast are separated and grouped together to produce contrast charts of visibility distance vs. turbidity for a family of curves of contrast parameters. FIG. 5 shows a graphical representation of an example of such contrast charts.

Next, a color version of the underwater laser imaging apparatus will be illustrated with reference to FIGS. 6 and 7.

Figure 6:
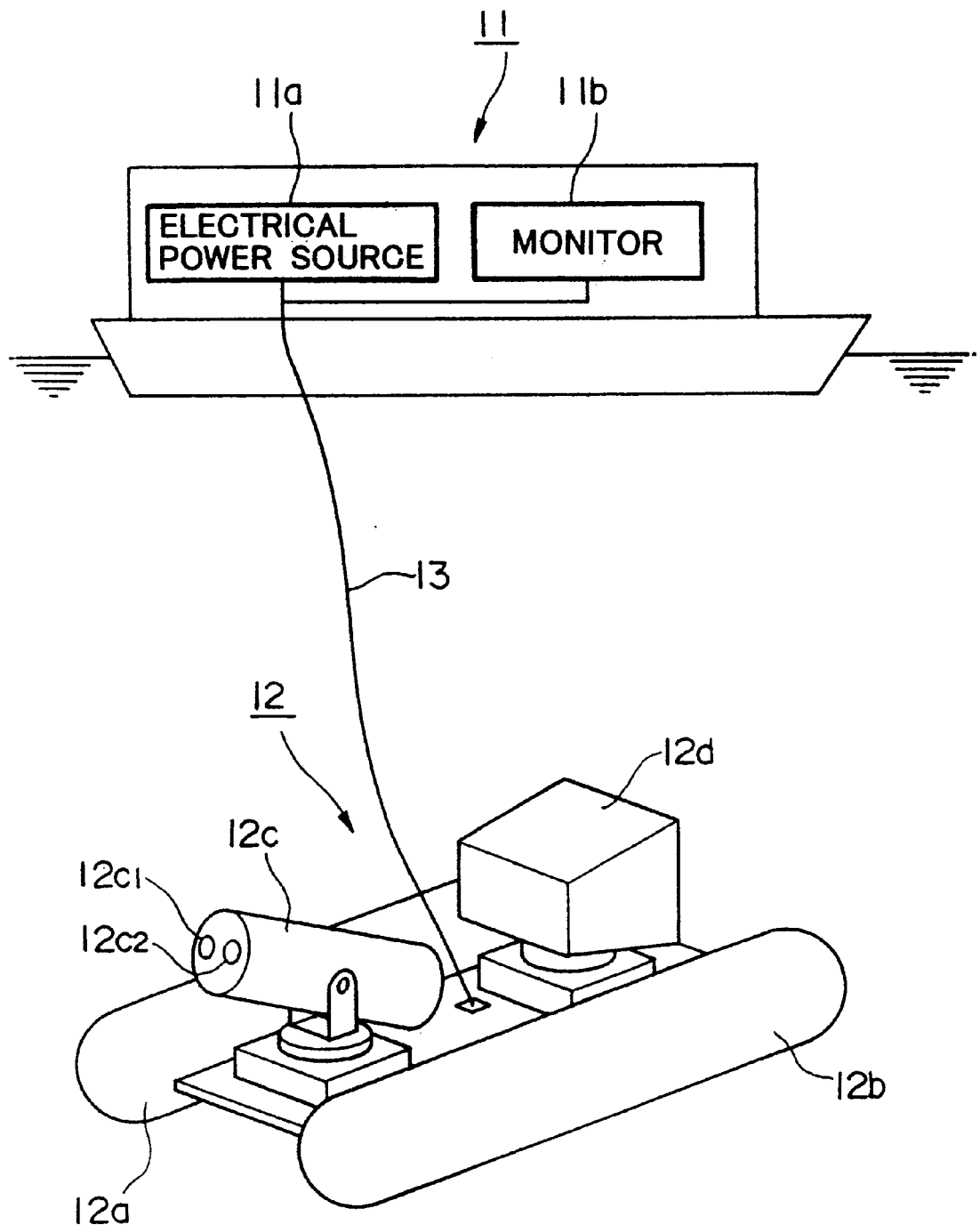
FIG. 6 is an overall illustration of the underwater laser image apparatus.

FIG. 6 shows a support vessel 11 connected to a submersible unmanned vessel 12 though a cable 13. The support vessel 11 is provided with an electrical power source 11a to supply electrical power to the submersible vessel 12 and an image monitor 11b to display images of an observation object supplied from the submersible vessel 12 traveling through a beam transmission medium.

The submersible unmanned vessel 12 comprises a pressure containers 12a, 12b, a laser irradiation/imaging device 12c and a display device 12d. The pressure containers 12a, 12b are made to withstand high pressures, and protects the devices contained therein (to be described below) from hydrostatic pressures. Laser irradiation/imaging device 12c comprises an irradiation section 12c1 and a beam receiver section 12c2 protected by pressure resistant glass arrangements. Pulsed laser beam is radiated from the irradiation section 12c1 towards the underwater object, and the reflected beam pulses from the underwater object are captured by the beam receiver section 12c2. The display device 12d may be a liquid crystal display panel for displaying images formed by the reflected beam pulses, because it is a small light weight device requiring low power consumption.

Figure 7:
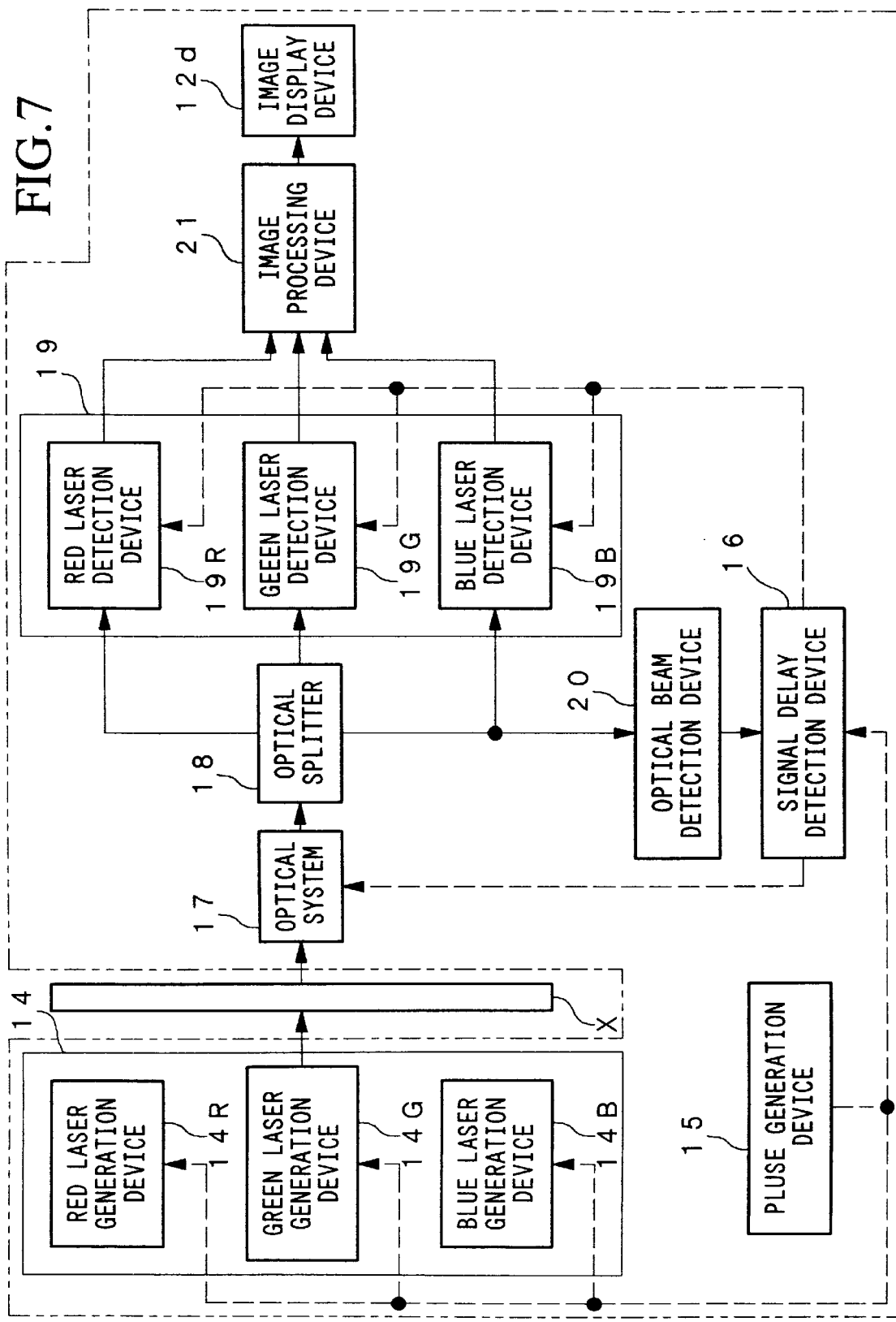
FIG. 7 is a block diagram of the electrical circuitry in the submersible vessel of the underwater laser imaging apparatus.

FIG. 7 shows a block diagram of the imaging system in which a laser irradiation device 14 comprises a red laser generation device 14R, a green laser generation device 14G and a blue laser generation device 14B. The laser irradiation device 14 radiates a pulsed laser beam towards the observation object X.

The red laser generation device 14R generates red laser pulses synchronized with a pulsing rate at 50 Hz at a center wavelength of 700 nm and a pulse width of 6 ns, and may be made of any of the non-linear optical devices, such as yttrium aluminum garnet (YAG) laser capable of generating variable output wavelengths.

The green laser generation device 14G generates green laser pluses synchronized with a pulsing rate at 50 Hz, for example at a center wavelength of 540 nm and a pulse width of 6 ns, and is comprised by the same variable wavelength YAG laser.

The blue laser generation device 14B generates blue laser pluses synchronized with a pulsing rate at 50 Hz at a center wavelength of 450 nm and a pulse width of 6 ns, and is comprised by the same variable wavelength YAG laser. The laser pulses of red, green and blue colors generated, respectively, from the red, green and blue laser generation devices, 14R, 14G and 14B, are synchronized with the respective pulsing rates by Q-switching to provide output pulses of stable wavelengths and high output power.

The pulse generation device 15 generates synchronizing pulses to be supplied to the red, green and blue laser generation devices 14R, 14G and 14B, and to a signal delay detection device 16.

The optical system 17 includes such light optical devices as zoom lenses and reflector mirrors, and performs the function of capturing the reflected beams (red, green and blue laser pulses) reflected from the object and propagating them to an optical splitter device 8. The optical system 17 aligns the focal point of the reflected beam pulses with the beam receiving surface of the laser beam detection device 19 in accordance with the focusing signals supplied from the signal delay detection device 16. The optical splitter 18 may be a semi-transparent mirror so as to transmit a portion of the reflected beam to the laser beam detection device 19, and the remainder to an optical beam detection device 20.

The optical beam detection device 20 receives reflected beams which exhibit a two-dimensional spread of a diffused beam, and converts a portion thereof, for example its center intensity, to electrical signals to output to the signal delay detection device 16. The signal delay detection device 16 measures the chronological delays (i.e., phase difference) between the synchronizing signals, output from the pulse generation device 15 to the device 16, and the arrival times of the reflected beams, to generate delay signals to be supplied to the laser beam detection device 19. The signal delay detection device 16 also determines the level of strength of the arrival signals, and feedback the data to the optical system 14 as focusing signals related to the intensities of the reflected beams.

The laser beam detection device 19 comprises a red laser beam detection device 19R, a green laser beam detection device 19G and a blue laser beam detection device 19B. The red laser beam detection device 19R is a type of highly sensitive solid-state camera comprising an image intensifier (which is an optical amplifier having a red filter and a shutter), pixel elements, and a scanning device.

The red laser beam detection device 19R separates out only the reflected beams of the red wavelength output from the red laser generation device 14R, and controls opening and closing of the shutter device of the image intensifier, according to the delay signals, so that the pixel elements respond only during the durations of shutter opening for the red reflection signals. Then, it scans the red reflection beams radiating on the pixel elements in two-dimensions, from a given end on the screen to the opposite end successively so as to convert the reflected beam signals to the red component image signals to complete the red image portion of the three primary colors.

The green laser beam detection device 19G is a type of highly sensitive solid-state camera comprising an image intensifier (which is an optical amplifier including a green filter and a shutter), pixel elements, and a scanning device. The green laser beam detection device 19G separates out only the green reflection beams of the green wavelength output from the green laser generation device 14G, and controls opening and closing of the shutter device of the image intensifier, according to the delay signals, so that the pixel elements respond only during the durations of shutter opening for the green reflection signals. Then, it scans the diffuse green reflection beams radiating on the pixel elements in two-dimensions, from a given end on the screen to the opposite end successively so as to convert the reflected beam signals to the green component image signals to complete the green image portion of the three primary colors.

The blue laser beam detection device 19B is a type of highly sensitive solid-state camera comprising an image intensifier (which is an optical amplifier including a blue filter and a shutter), pixel elements, and a scanning device. The blue laser beam detection device 19B separates out only the blue reflection beams of the blue wavelength output from the blue laser generation device 14B, and controls opening and closing of the shutter device of the image intensifier, according to the delay signals, so that the pixel elements respond only during the durations of shutter opening for the blue reflection signals. Then, it scans the diffuse blue reflection beams radiating on the pixel elements in two-dimensions, from a given end on the screen to the opposite end successively so as to convert the reflected beam signals to the blue component image signals to complete the blue image portion of the three primary colors.

The image processing device 12 processes the red, green and blue image signals according to various signal conditioning steps, such as noise reduction and outline intensification, and the processed signals are synthesized to produce composite image signals to be output to the display device 12d and the image monitor 11b.

The underwater laser imaging apparatus providing three-primary-color images operates in the following manner. Red, green and blue laser pulses synchronized to the pulse generation device 15 are radiated towards the underwater object X and propagate through the water medium, and the reflected beams of the individual color components are similarly propagated through the water medium, and are received, through the optical system 17 and the optical splitter 18, by the respective red, green and blue laser beam detection devices 19R, 19G and 19B. Focusing lenses in the optical system 17 are adjusted according to the focusing signals produced by the signal delay detection device 16 to align the focal points of the reflected color beams with the respective beam receiving surfaces of the pixel elements.

In the red laser beam detection device 19R, only the red reflections are allowed to pass through the red filter, and the intensity values are measured and digitized to be scanned into red image signals which are output to the image processing device 21. Simultaneously, in the green laser beam detection device 19G, only the green reflections are allowed to pass through the green filter, and the intensity values are measure and digitized to be scanned into green image signals, and are output to the image processing device 21. Also, simultaneously, in the blue laser beam detection device 19B, only the blue reflections are allowed to pass through the blue filter, and the intensity values are measured and digitized to be scanned into blue image signals, and are output to the image processing device 21.

In the process of imaging the underwater object X, the intensity values of the reflected signals are measured intermittently, that is, by detecting only those reflected beam pulses existing during the time period of its own beam generation, by controlling opening and closing of the shutter according to delay signals. Specifically, the laser pulses traveling through the turbid medium are scattered by the suspended particles in the medium. In other words, the reflected beam pulses captured by the optical system 17 include direct reflection beams and scattered reflection beams produced by the beams reflected by the object X. Because the optical path of the direct reflection beams is different from the optical path of the scattered reflection beams, they arrive at the optical system 17 at different times. Therefore, by controlling the action of the shutter device in accordance with the arrival times of the direct reflection beams, only the direct reflection beams are measured, and the scattered beams, which form a noise component, can be eliminated.

Accordingly, red, green and blue imaging signals, based only on direct reflection beams, are synthesized into a composite image after being processed in the image processing device 21, with noise filtering, outline intensification and other image upgrading steps. In other words, the composite imaging signals are produced by illuminating the object with a pulsed laser beam of good linearity and monochromatic wavelength, and are produced only from direct reflection beams so as to result in images that are crisp and contain few noises.

The use of the underwater color laser imaging apparatus presented in the foregoing embodiment was illustrated in a turbid water medium having suspended particles, but the application of the present apparatus is not limited to such an environment. It should be noted that other transmission media, such as air having floating particles which scatter illumination lighting, are equally applicable.

FIG. 8 presents another embodiment of the apparatus to generate even more clear images. The external appearance of the apparatus is the same as that shown in FIG. 6.

The laser generation device 24 is a laser generator based on a non-linear optical material, similar to the YAG laser presented above. A laser generator 14 is a variable wavelength beam generator, and produces laser beam pulses having different wavelengths according to the wavelength selection signal supplied from a pulse generation device 25. The wavelengths can be varied in a range from 480 to 610 nm, as an example.

The laser generation device 24 generates pulses synchronous with the pulse signals supplied from the pulse generation device 25, and uses a frequency of 50 Hz, for example, to generate a pulse width of 5 ns. In this case, the laser generation device 24 may utilize a synchronization technique based on Q-switching to produce high power laser pulses efficiently from a supply voltage delivered by a laser generation power source 26.

Electrical power to the submersible vessel 12 is supplied from an alternating current power supply 11a on board the support vessel 11, which is capable of supplying several thousand volts, and the laser generation power supply 26 transforms the primary high voltage into, for example, an alternating current at 200 volts and 60 Hz, to supply power to the laser generation device 24 and a cooling device 27.

The cooling device 27 is used to provide cooling to the laser generation device 24 by taking in, for example, water surrounding the pressure containers 12a. The use of surrounding water for cooling enables the size of the cooling device 27 to be made small, and the cooling efficiency to increase. The pulse generation device 25 outputs wavelength selection signal, for enabling to select a suitable wavelength, to the laser beam generation device 24, and outputs synchronizing pulses to laser generation device 24 and signal delay detection device 28.

The optical system 29 is comprised of lenses and mirrors and the like, and guides the laser pulses output from the laser generation device 24 to the irradiation section 12c1 and selects a suitable spot diameter of the pulsed beam for illuminating the object X.

In this case, because the laser generation device 24 is located in the submersible vessel 12, the laser pulses can be directed to the object X without the need to propagate through an optical transmission medium, such as optical fiber, which limits the optical energy (luminous flux) that can be transmitted.

The optical splitter 30 may comprise a semi-transparent mirror, and transmits a portion of the pulses reflected from the object X to a laser beam detection device 31 and reflects the remainder of the reflected pulses to an optical beam detection device 32.

The optical beam detection device 32 selects pulses from a certain location of the diffused reflected pulses which spread back to the object in a two-dimensional space, for example, the central section. The intensity of the central pulses are converted into corresponding electrical intensity signals to be output to the signal delay detection device 28. The signal delay detection device 28 determines the time difference (phase difference) between the electrical intensity signals and the synchronizing pulses, and forwards the time data as delay signals to the laser beam detection device 31, and also determines the level of the electrical intensity signals and forwards the data, as intensity related focusing signals, to the laser beam detection device 31.

The laser beam detection device 31 is a type of sensitive camera, and comprises an image intensifier, which is an optical amplifier having a focus lens and shutter function, pixel elements and a scanning device. The laser beam detection device 31 adjusts the focusing lens according to the focusing signals to match the focal point of the reflected beams with the light receiving surface of the pixel elements, as well as operates the shutter device by controlling the image intensifier according to the delay signals. so that the pixel elements respond only during that time period in which the first-to-arrive pulses are being received. The reflected pulses with a two-dimensional spread in intensity are successively scanned starting from one edge of the pixel elements to convert the intensity data into an image of the object X, and outputs the image signals to the image processing device 33.

The image processing device 33 provides image conditioning steps, such as reducing the noise and intensifying the outlines, to the image signals, and outputs the processed image signals to the display device 12d and the image monitor 11b. Although not shown in the drawings, all of the above devices, excepting the laser generation device 24 and the cooling device 27, are supplied with electrical power form dedicated power circuits. These power circuits are operated by rectifying the alternating current power supplied by the power source 11a.

Most of the devices mentioned above, inclusive of the laser generation device 24 to image processing device 33, are stored in the submersible vessel 12, however, the laser generation device 24, which consumes high power and generates high heat, is stored along with the cooling device 27 inside the pressure container 12a, and other devices are stored in the pressure container 12b. All of these devices are controlled through a controller which is not shown in the drawing.

The operation of the laser imaging device of the second embodiment will be presented.

First, before any attempt is made to observe the object X, it is necessary to select optimum scanning wavelengths for the laser pulses. More specifically, the irradiation and imaging device 12c is directed at the underwater object by a diver or by control action from the support vessel 11, then the object X is successively scanned with the laser pulses according to a wavelength selection signal, starting with the shortest wavelength, i.e., 480 nm, generated from the laser generation device 24. The process of scanning is continued with a series of wavelengths longer than 480 nm, which are output successively from the laser generation device 24. The scanning wavelengths are varied over a range between 480~610 nm, either continuously or discontinuously in steps of a given small range of wavelengths.

These scanning beams are directed through the water medium successively to the object X from the optical system 29, and the reflected beams are detected by the optical beam detection device 32, which outputs intensity signals, showing the intensity values of the reflected beams for the various scanning wavelengths, are output to the signal delay detection device 28.

It should be noted that the transmissivity of the laser pulses through the water medium is wavelength-dependent, in relation to the characteristics of the water medium such as turbidity and the size of suspended particles. In other words, a wavelength for maximizing the reflected intensity measured by the optical beam detection device 32 is different for different qualities of the water medium existing between the submersible vessel 12 and the object X. By comparing the levels of the measured intensity signals for different test wavelengths, the signal delay detection device 28 is able to select a wavelength which provides the maximum transmission through the existing water medium (an optimum wavelength). For example, if the optimum wavelength is found to be 550 nm, the signal delay detection device 28 instructs the laser generation device 24 to select a wavelength of 550 nm as the operational wavelength for scanning the object X.

Scanning of the object X is performed using the operational wavelength of 550 nm as the optimum wavelength for the existing condition of the water medium. The laser pulses are then directed to the object X, and for the imaging process, the focusing signals generated according to the intensity of the reflected beams are supplied from the optical beam detection device 32 to the laser beam detection device 31, and focusing is performed by matching the focal point of the reflected beams with the beam receiving surface of the pixel element.

Further, the shutter timing of the image intensifier is controlled according to the delay signals generated by the reflected beam pulses so that the pixel elements are responsive only during the time periods in which the fastest-arriving pulses are being received by the pixel elements. By controlling the shutter timing in this manner, scattered beams generated by the suspended particles existing in the water medium between the submersible vessel 12 and the object X are eliminated so that only those reflected pulses reflecting directly from the object X are detected in the laser beam detection device 32.

Continuing with the imaging process, the intensities of the reflected beam pulses which are radiating on the pixel elements in a two-dimensional space are scanned starting from a given end section successively across the pixels to form image signals of the object X which are output to the display device 33. The image signals are subjected to image conditioning steps, such as reduction of noise and intensifying of the outlines, in the image processing device 33 and are then output to the display device 12d and the monitor 11a. The display device 12d and the monitor 11a can then display a clear image of the object X.

According to the laser imaging apparatus of the second embodiment, the laser generation device 24 and the cooling device 27 are made compact enough to be housed in the pressure container 12a of the submersible vessel 12. The cooling device 27 is able to utilize surrounding water effectively for cooling the laser generation device 24. Therefore, compared with the conventional laser imaging equipment which provides a laser generation device on the support vessel so that laser beams must be transmitted through an optical fiber cable, the intensity of the laser pulses for scanning the object can be increased significantly. The result is that the width of the laser pulse can be narrowed, so as to eliminate the scattered pulses caused by the suspended particles in the water medium, to generate crisp clear images having reduce background noise.

What is claimed is:

1. A laser imaging apparatus for observing an underwater object disposed in a beam transmission medium comprising:

a laser generation device for generating three primary colors of visible light, each color comprised by a pulsed laser beam having a respective wavelength, and irradiating pulsed laser beams towards said underwater object;

a laser beam detection device for separating reflected beam pulses reflecting from said underwater object into a wavelength component representing each of said three primary colors, determining an intensity value for each of three wavelength components and outputting three primary color signals according to intensity values; and an imaging device for forming an image of said underwater object based on said three primary color signals.

2. An apparatus according to claim 1, wherein said beam transmission medium is water.

3. An apparatus according to claim 2, wherein said laser generation device and said laser beam detection device are disposed in an unmanned submersible vessel.

4. An underwater laser imaging apparatus comprising:

a laser irradiation device disposed underwater for irradiating an underwater object with a pulsed laser beam;

a laser generation device disposed underwater for generating a plurality of colors of light in said pulsed laser beam;

a laser beam detection device for receiving reflected beam pulses reflected from said underwater object; and an image processing device for forming images of said underwater object according to output signals from said laser beam detection device.

5. An apparatus according to claim 4, wherein said laser irradiation device is provided with a cooling device utilizing surrounding water for cooling said laser generation device.

* * * * *

UNITED STATES PATENT AND TRADEMARK OFFICE
CERTIFICATE OF CORRECTION

PATENT NO. : 6,115,511　　　　　　　　　　　　　　　　　　　　　　　Page 1 of 1
DATED : September 5, 2000
INVENTOR(S) : Hiroshi Sakai, et al.

It is certified that error appears in the above-identified patent and that said Letters Patent is hereby corrected as shown below:

On the title page, item [73] should read:

—[73] Assignees: Director General of the 1$^{st}$ District Port Construction Bureau, Ministry of Transport, Niigata; Director General of Port and Harbour Research Institute, Ministry of Transport, Yokosuka; Ishikawajima-Harima Heavy Industries Co., Ltd., Tokyo, all of Japan Signed and Sealed this Twelfth Day of June, 2001

*Attest:*

NICHOLAS P. GODICI
*Attesting Officer*　　　*Acting Director of the United States Patent and Trademark Office*